United States Patent
Sells et al.

(10) Patent No.: US 11,035,814 B2
(45) Date of Patent: Jun. 15, 2021

(54) MICROFLUIDICS DETECTION

(71) Applicant: Hewlett-Packard Development Company, L.P., Houston, TX (US)

(72) Inventors: Jeremy Sells, Corvallis, OR (US); Chantelle E. Domingue, Corvallis, OR (US); Manish Giri, Corvallis, OR (US); Melinda M. Valencia, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 206 days.

(21) Appl. No.: 15/545,406

(22) PCT Filed: Jan. 30, 2015

(86) PCT No.: PCT/US2015/013686
§ 371 (c)(1),
(2) Date: Jul. 21, 2017

(87) PCT Pub. No.: WO2016/122565
PCT Pub. Date: Aug. 4, 2016

(65) Prior Publication Data
US 2018/0011042 A1    Jan. 11, 2018

(51) Int. Cl.
*G01N 27/06* (2006.01)
*B01L 3/00* (2006.01)
(Continued)

(52) U.S. Cl.
CPC ........ *G01N 27/06* (2013.01); *B01L 3/502715* (2013.01); *G01N 15/1031* (2013.01); *G01N 15/1056* (2013.01); *B01L 2200/0652* (2013.01); *B01L 2300/023* (2013.01); *B01L 2300/0645* (2013.01); *G01N 2015/0065* (2013.01); *G01N 2015/1006* (2013.01)

(58) Field of Classification Search
None
See application file for complete search history.

(56) References Cited

U.S. PATENT DOCUMENTS

| 5,550,059 A | * | 8/1996 | Boger ................... G01F 23/242 422/106 |
| 5,719,556 A | | 2/1998 | Albin et al. |

(Continued)

FOREIGN PATENT DOCUMENTS

| CN | 102200463 A | 9/2011 | |
| WO | WO-2014062551 A1 * | 4/2014 | ........ B01L 3/502792 |
| WO | WO-2014178827 | 11/2014 | |

OTHER PUBLICATIONS

McGuinness et al., Microfluidic Sensing Device, Appln. No. PCT/US2014/0137848; Filed Jan. 30, 2014.
(Continued)

*Primary Examiner* — Matthew D Krcha
(74) *Attorney, Agent, or Firm* — Fabian VanCott

(57) ABSTRACT

A method of microfluidic detection can include detecting, using an impedance sensor, an impedance of a fluid to indicate whether a threshold amount of fluid has been received in a reservoir of a microfluidic chip. The method can include initiating a test performed by the microfluidic chip on the received fluid when the threshold amount of fluid has been received.

20 Claims, 6 Drawing Sheets

(51) Int. Cl.
*G01N 15/10* (2006.01)
*G01N 15/00* (2006.01)

(56) References Cited

U.S. PATENT DOCUMENTS

| | | | |
|---|---|---|---|
| 5,975,153 A * | 11/1999 | Hill | B01L 3/502715 |
| | | | 141/31 |
| 6,169,394 B1 | 1/2001 | Frazier et al. | |
| 6,598,963 B1 | 7/2003 | Yamamoto et al. | |
| 7,621,181 B2 | 11/2009 | Cammarata et al. | |
| 8,372,600 B2 | 2/2013 | Sachs et al. | |
| 2002/0181962 A1 | 12/2002 | Henricus et al. | |
| 2003/0106853 A1 * | 6/2003 | Stone | B01D 17/00 |
| | | | 210/746 |
| 2003/0121788 A1 | 7/2003 | Gascoyne et al. | |
| 2003/0153844 A1 * | 8/2003 | Smith | A61B 10/0051 |
| | | | 600/573 |
| 2006/0051738 A1 * | 3/2006 | Zweig | G01N 33/523 |
| | | | 435/4 |
| 2006/0105467 A1 * | 5/2006 | Niksa | G01N 27/126 |
| | | | 436/150 |
| 2009/0047440 A1 | 2/2009 | Giri et al. | |
| 2010/0213080 A1 * | 8/2010 | Celentano | A61B 5/0002 |
| | | | 205/777.5 |
| 2011/0008816 A1 * | 1/2011 | Ball | G01N 33/56972 |
| | | | 435/29 |
| 2011/0120219 A1 * | 5/2011 | Barlesi | G01F 23/266 |
| | | | 73/304 C |
| 2014/0190830 A1 | 7/2014 | Sturmer et al. | |

OTHER PUBLICATIONS

Sadeghi, et al. "On Chip Droplet Characterization: a Practical, High-sensitivity Measurement of Droplet Impedance in Digital Microfluidics", Jan. 16, 2012, Analytical Chemistry vol. 84 No. 4 pp. 1915 1923.

* cited by examiner

MICROFLUIDICS DETECTION

BACKGROUND

Microfluidics is a technology that applies across a variety of disciplines including engineering, physics, chemistry, microtechnology and biotechnology. Microfluidics involves the study of small volumes of fluid and how to manipulate, control and use such small volumes of fluid in various microfluidic systems and devices such as microfluidic chips. For example, microfluidic biochips (referred to as "lab-on-chip") are used in the field of molecular biology to integrate assay operations for purposes such as analyzing enzymes and DNA, detecting biochemical toxins and pathogens, diagnosing diseases, etc.

DETAILED DESCRIPTION

A living cell is the basic structural and functional unit of an organism. Most animal and plant cells range in size from 1-100 micrometers and contain vital health information. Cell-based diagnostics may be used for detecting infectious diseases (HIV, Malaria, Tuberculosis), as well as chronic diseases (cancer, cardiac diseases, autoimmune diseases). Some cellular level diagnostic tools may, for example, be expensive, utilize specialized training to operate, and/or may not be suitable to deploy at a point-of-care setting.

Healthcare is gradually migrating away from centralized hospitals to a more distributed and/or in-home setting. This transition may rely on technology that provides the same level of performance and functionality as tests that are done in hospitals using sophisticated machinery, although in a smaller and more portable form. A microfluidics sensing system in accordance with the present disclosure can provide laboratory level diagnostic performance at the convenience of a household and/or a remote setting. For purposes of this disclosure, the term "microfluidic" refers to devices and/or passages which interact with fluids having a volume or carrying particles having dimensions in the "micro" range, microliter or micrometer, respectively. A "fluid" may comprise a liquid, a gas or mixtures thereof. As described further herein, a test can be initiated, powered and driven by a microfluidics application on a portable computing device. The microfluidics application can direct a microfluidic chip that has embedded pumps, drop ejectors, impedance sensors and/or thermal sensors among other components to perform a test on a biologic sample. The microfluidics sensing system in accordance with the present disclosure can allow digital data to be captured and analyzed on a portable computing device, and can allow results to be provided to healthcare providers, patients, and/or other users in a shorter period of time and at a lower cost as compared to hospital diagnostic tests.

Figure 1:
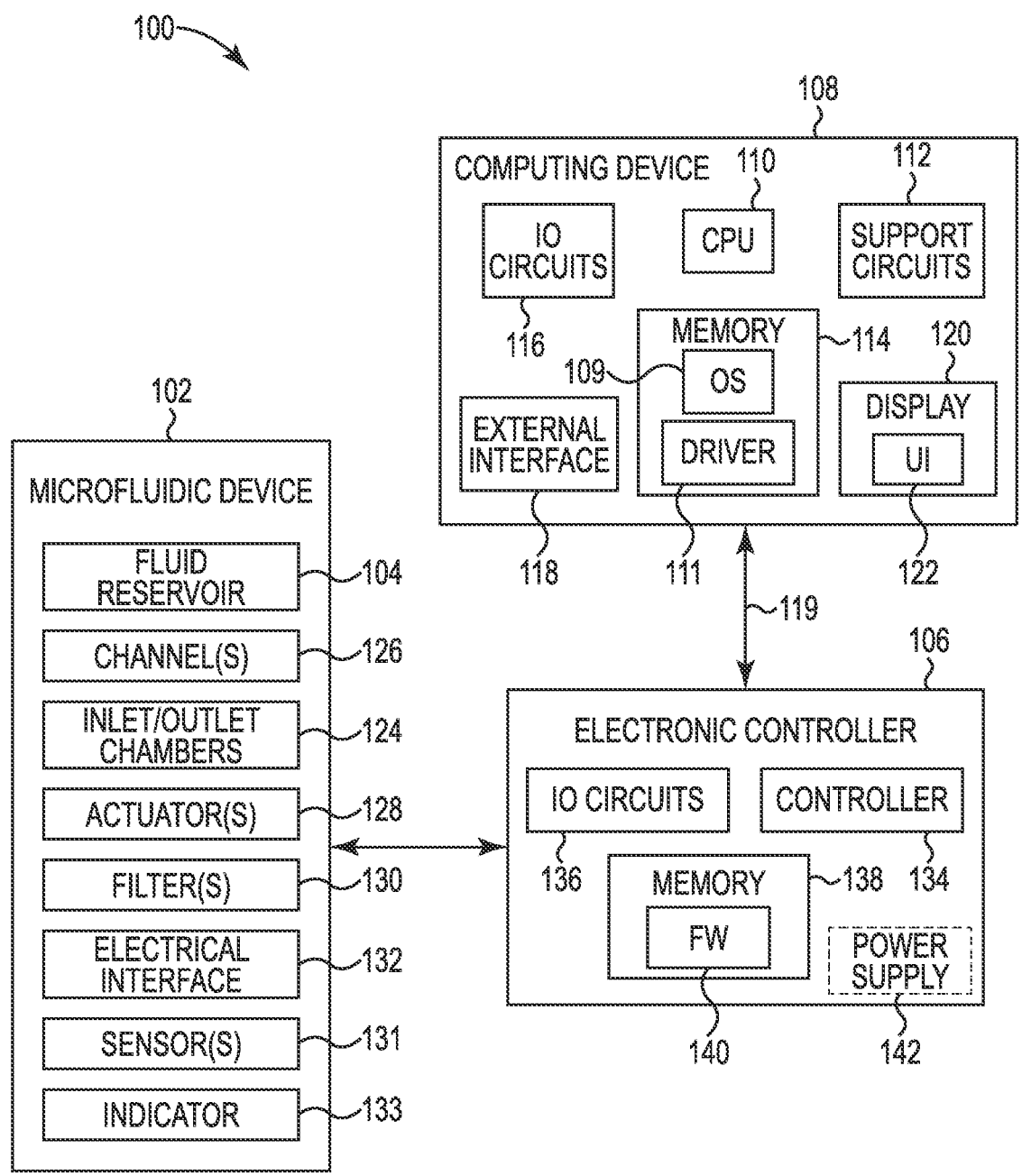
FIG. 1 illustrates an example of a microfluidic sensing system according to the present disclosure.

FIG. 1 illustrates an example of a microfluidic sensing system 100 according to the present disclosure. The example microfluidic diagnostic system 100 includes a microfluidic device 102, a fluid reservoir 104, an electronic controller 106, and a computing (e.g., host) device 108. In general, fluid is placed in the fluid reservoir 104. The fluid reservoir 104 can be located on and/or formed in an outer surface (i.e., a cassette) of the microfluidic device 102. The fluid can be a host fluid having particles (e.g., a blood sample, an ink containing pigments/particles, or the like). The fluid 102 is processed through microfluidics and applied to a sensor in the microfluidic device 102 under control of the electronic controller 106. The microfluidic device 102 provides an electrical output signal representing the sensor data to the electronic controller 106. The electronic controller 106 is under control of the computing device 108. The computing device 108 can send and receive data to and from the electronic controller 106, including command information for controlling the microfluidic device 102 and sensor data obtained from the microfluidic device 102.

The computing device 108 generally includes a central processing unit (CPU) 110, various support circuits 112, memory 114, various input/output (I/O) circuits 116, and an external interface 118. The CPU 110 can include any number of microprocessors capable of executing instructions stored by a memory 114. CPU 110 can be integrated in a single device or distributed across multiple devices (e.g., computing devices, and/or the microfluidic device, a server, etc.). The support circuits 112 can include cache, power supplies, clock circuits, data registers, and the like. The memory 114 can include random access memory, read only memory, cache memory, magnetic read/write memory, or the like or any combination of such memory devices. The I/O circuits 116 can cooperate with the external interface 118 to facilitate communication with the electronic controller 106 over a communication medium 119. The communication medium 119 can be any type of electrical, optical, radio frequency (RF), or the like transfer path.

In an example, the external interface 118 can include a universal serial bus (USB) controller capable of sending and receiving data to the electronic controller 106, as well as providing power to the electronic controller 106, over a USB cable. It is to be understood that other types of electrical, optical, or RF interfaces to the electronic controller 106 can be used to send and receive data and/or provide power.

The memory 114 can store an operating system (OS) 109 and a driver 111. The OS 109 and the driver 111 can include instructions executable by the CPU 110 for controlling the computing device 108 and the electronic controller 106 through the external interface 118. The driver 111 provides an interface between the OS 109 and the electronic controller 106. Accordingly, the computing device 108 comprises a programmable device that includes machine-readable instructions stored in the form of software modules, for example, on non-transitory processor/computer readable-media (e.g., the memory 114).

The computing device 108 can include a display 120 through which the OS 109 can provide a user interface (UI) 122. A user can use the UI 122 to interact with the OS 109 and the driver 111 to control the electronic controller 106 and/or the microfluidic device 102 and display data received from the electronic controller 106 and/or microfluidic device 102. For example, the user can use the UI 122 to initiate a microfluidics application on the microfluidic device 102, and select a test to perform on a biologic sample, using the microfluidic chip of the microfluidic device 102. As used herein, a user can refer to a healthcare professional and/or a patient. However, examples are not so limited, and a user can refer to any type of user other than healthcare professionals and patients. In an example, the computing device 108 can be a mobile computing device, such as a "smart phone," "tablet" or the like.

The computing device 108 can also display data received from the electronic controller 106. For instance, the portable computing device 108 can display a graphical user interface associated with the microfluidics application 120, as well as data collected, displayed, and/or analyzed by the microfluidic device 102 and/or electronic controller 106. In some examples, data displayed on the UI 122 of the computing device 108 can include a diagnosis, such as diagnosis of a particular disease state such as diabetes, human immunodeficiency virus (HIV), and bladder cancer, among others. In some examples, data displayed on the UI 122 of the computing device 108 can include a graph, table, and/or other summary describing data collected using the microfluidic chip of the microfluidic device 102. For example, the UI 122 of the portable computing device 108 can display data indicating a particular level (e.g., a threshold level) of fluid has been received in the fluid reservoir 104. Examples are not so limited, however, and the UI 122 of the computing device 108 can display other forms of data collected with the microfluidic device 102 and/or electronic controller 106. In some examples, the portable computing device 108 can be a device such as a "smart phone", a tablet computer, or other device.

The fluid reservoir 104 can be in fluidic communication with the microfluidic device 102. The fluid reservoir 104 can hold and supply fluidic components/samples and/or solutions to the channels(s) 126 and/or inlet/outlet chambers 124 of the microfluidic device 102. The microfluidic device 102 can be implemented as a chip-based device. Various example implementations of the device 102 are described below and can generally include inlet/outlet chamber(s) 124, microfluidic channel(s) 126, actuator(s) 128, microfluidic filter(s) 130, sensor(s) 131, and an electrical interface 132. The electronic controller 108 is coupled to the electrical interface 132 for energizing the actuator(s) 128 and sensor(s) 131. In general, the structures and components of the chip-based microfluidic device 102 can be fabricated using various integrated circuit microfabrication techniques such as electroforming, laser ablation, anisotropic etching, sputtering, dry and wet etching, photolithography, casting, molding, stamping, machining, spin coating, laminating, and so on.

The microfluidic device 102 can include indicator 133. Indicator 133 can be a hardware indicator, a hardware flag, etc. Indicator 133 can indicate a particular property and/or parameter (e.g., local properties, global properties, type of fluid) of the fluid. For example, indicator 133 can be an indication of a presence of fluid, of a fluid volume, of a type of fluid, etc. That is, indicator 133 can indicate a volume of fluid has reached a particular threshold value. Indicator 133 can indicate the fluid is a particular type of fluid (e.g., blood, diluted blood, reagents, blood mixed with a reagent, other biological fluids, etc.). Indicator 133, when indicating a particular parameter (e.g., a threshold has been met, a type of fluid has been received), can be used to initiate a test. For example, when indicator 133 indicates a particular volume of fluid has been received, a test can be initiated on the fluid. Put another way, a measurement of a volume of the fluid (e.g., an impedance measurement) can be performed and the measured volume can be compared to a threshold volume that indicates to perform a test. When the comparison indicates the threshold has been received, indicator 133 can be set and a test can be initiated. When indicator 133 indicates a presence of fluid received, a sensing can be performed to determine how much (e.g., what volume of) fluid has been received.

While particular examples are given, examples are not so limited. Indicator 133 can be used to indicate a number of different indications and/or initiate a number of further sense operations and/or tests on the fluid. For example, a change in impedance can be an indication to change a parameter of the test, terminate the test, and/or administer a different test. A change in a rate of change of impedance can be an indication to alter the testing. That is, a threshold value can include a rate of change of a value. The indication for a rate of change can indicate to change a rate of movement of fluid through the microfluidic chip (e.g., pumping or ejection can occur at a different rate). A test can be initiated automatically once a determination that a particular parameter and/or threshold of the parameter has been indicated. A test can be initiated by a user when an indication to a user indicates to initiate the test (e.g., after a threshold amount has been received, a type of fluid has been received, etc.).

While a single indicator is described above, examples are not so limited. A number of indicators can indicate a number of fluid volumes, types, etc. For example, a first fluid can be received by a first reservoir and a measurement can determine whether to set a first indicator. A second fluid can be received in a second reservoir and an additional measurement (e.g., same measurement on the second fluid, different measurement on the second fluid, etc.) can determine whether to set a second indicator. The first fluid and the second fluid can be combined once the first indicator and the second indicator are set. The number of indicators and/or fluids is not limited to two, as in this example.

In one example, the electronic controller 108 includes a controller 134, I/O circuits 136, and a memory 138. In an example, the electronic controller 108 receives power from the computing device 108. In another example, the electronic controller 108 can include a power supply 142.

The memory 138 can store instructions 140, which can be executable by the controller 134 for controlling the microfluidic device 102 and communicating with the computing device 108. Accordingly, the electronic controller 106 comprises a programmable device that includes machine-readable instructions stored, for example, on non-transitory processor/computer readable-media (e.g., the memory 138). It is to be understood that a controller can execute instructions that the electronic controller 108 can implement in hardware, software/firmware, or a combination thereof. For example, all or a portion of the electronic controller 106 can be implemented using a programmable logic device (PLD, application specific integrated circuit (ASIC), or the like.

In at least one example, the fluid reservoir 104, the microfluidic device 102, and the electrical interface 132 can be electrically coupled to the electrical interface 132. The microfluidic device 102 can be removably coupled to the electronic controller 106 so that it can be coupled and uncoupled as needed. The electronic controller 106 can be coupled to the computing device 108 as described above.

Figure 2:
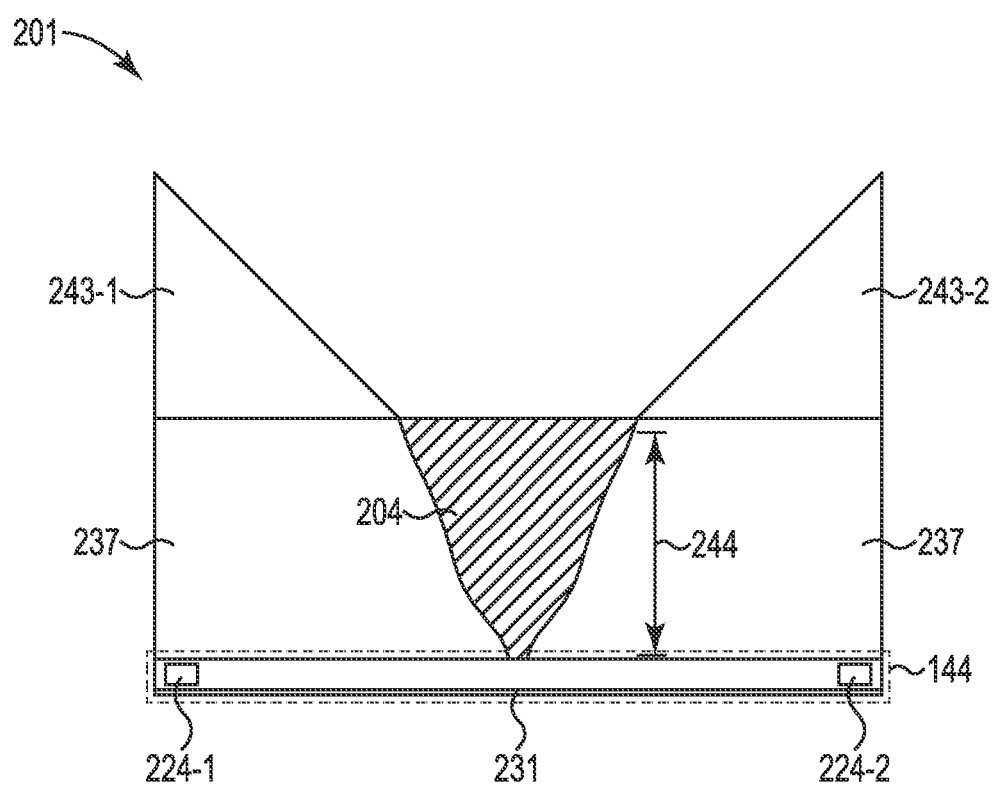
FIG. 2 illustrates an example of a microfluidic sensing device according to the present disclosure.

FIG. 2 illustrates an example of a microfluidic sensing device 201 according to the present disclosure. The microfluidic sensing device 201 can be a portion of a microfluidic device (e.g., microfluidic device 102 in FIG. 1). The microfluidic sensing device 201 can include a fluid reservoir 204 (e.g., as in fluid reservoir 104 in FIG. 1). The fluid in the fluid reservoir 204 can enter through a top opening of the microfluidic sensing device 201 between a number of slanted portions 243-1, 243-2. The fluid can flow down the slanted portions 243-1, 243-2 and into the fluid reservoir 204. The fluid in the fluid reservoir 204 can include a particular volume of fluid, indicated by a height 244 of the fluid in the fluid reservoir 204. The fluid reservoir 204 can be surrounded and/or in close proximity to silicon 237.

Fluid reservoir 204 can have an opening into sensing region 144 (e.g., at the bottom of fluid reservoir 204). Sensing region 144 can include a number of sensors 231 and a number of outlet chambers 224-1, 224-2. The number of sensors 231 can be in electrical communication with co-planar electrodes on silicon substrate (e.g., silicon 237). The co-planar electrodes on the silicon substrate can be fabricated using thin film deposition and etching techniques. The number of sensors 231 can be underneath the fluidics where the fluid flows across the sensors 231 and toward the outlet chambers 224-1, 224-2. The thickness of the co-planar electrodes can be within a 110A-5000A range (whereas 1000A=0.1 µm). The electrodes can be positioned closely (2-50 µm) together. The distance of electrodes can increase or decrease the detection sensitivity.

As fluid enters reservoir 204, sensors 231 can perform a number of sensing operations to determine whether fluid has been received. A sensing operation can be performed to determine a type of the fluid. An indicator (e.g., indicator 133 in FIG. 1) can indicate to proceed to test a volume of the received fluid when fluid has been received and a type of fluid has been verified.

Sensing operations performed by sensors 231 can determine whether a threshold volume of fluid has been received. When the threshold volume has been received, an indicator (e.g., indicator 133 in FIG. 1) can be set to indicate that a threshold volume has been received. When indicator 133 is set to indicate a threshold volume has been received, a test can be initiated on the fluid. For example, a threshold volume (e.g., reservoir 204 filled up to level 244) can be received and a test can be initiated. The test can be initiated by transporting the fluid through the sensing region 144 and through outlets 224-1 and 224-2, respectively.

While a single reservoir (e.g., reservoir 204) is illustrated examples are not so limited. An additional reservoir can hold an additional fluid to be sensed by an additional set of sensors. A first fluid in a first reservoir (e.g., reservoir 204) is sensed, measured, and determined to indicate a particular threshold value (e.g., a volume, a type, etc.). The additional fluid in an additional reservoir can be sensed, measured, and determined to indicate an additional particular threshold value (e.g., same as the particular threshold value, different than the particular threshold value). When an indicator indicates the first fluid includes the threshold value and an additional indicator indicates the additional fluid includes the additional threshold value, the first fluid and the additional fluid can be combined in a sensing region (e.g., such as sensing region 144) to perform a number of tests on the combined first fluid and additional fluid.

Figure 3:
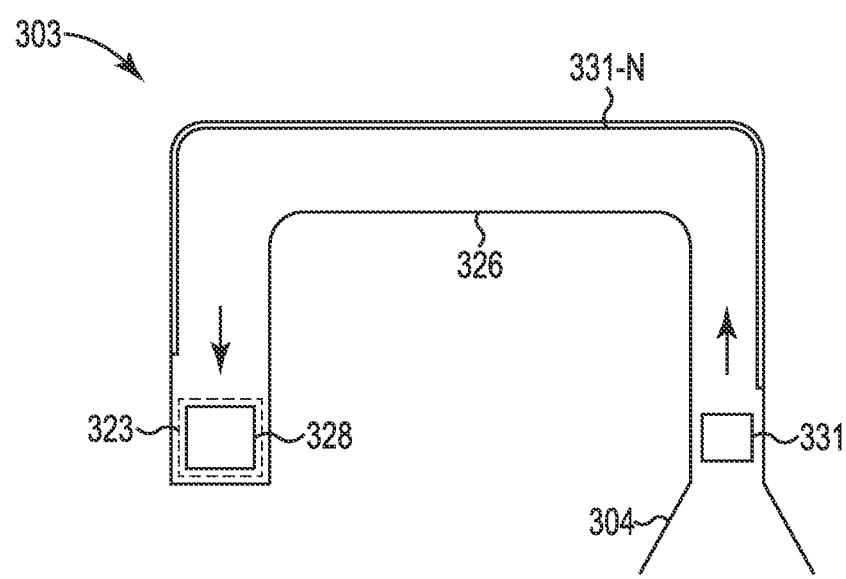
FIG. 3 illustrates an example of a microfluidic sensing device according to the present disclosure.

FIG. 3 illustrates an example of a microfluidic sensing device according to the present disclosure. The microfluidic sensing device 303 includes a microfluidic channel 326, a pump actuator 328, a sensor 331, a nozzle 323 (e.g., outlet), and a reservoir (e.g., inlet) 304 (such as reservoir 204 in FIG. 2). The channel 326 in FIG. 3 can represent a channel from the reservoir 304 (e.g., reservoir 204 in FIG. 2) to a nozzle 323 (e.g., outlet 224-1 in FIG. 2) where the fluid passes through a sensing region (e.g., sensing region 144).

In an example, a mesh filter (not pictured) can be placed over the reservoir 304 for filtering particles in the applied fluid sample. While the shape of the fluid channel 326 is shown as "u-shaped", this is not intended as a limitation on the shape of the channel 326. Thus, the shape of the channel 326 can include other shapes, such as curved shapes, snake-like shapes, shapes with corners, combinations thereof, and so on. Moreover, the channel 326 is not shown to any particular scale or proportion. The width of the channel 326 is not so limited and can be fabricated on a device in varying scale or proportion. The arrows in the channel indicate an example direction of fluid flow through the channel 326. The reservoir 304 provides an opening for the channel 326 to receive the fluid. The reservoir 304 can have a larger width and volume than the channel 326.

In an example, sensor 331-N is disposed in the channel 326 near the reservoir 304 (e.g., closer to the reservoir 304 than the pump actuator 328). In an example, sensor 331 can be disposed in the reservoir 304. The sensor 331 can be an impedance sensor formed using a number of semiconductor techniques. The sensor 331 can detect impedance changes as particles in the fluid pass over the sensor 331. However, examples are not so limited. As illustrated, a number of sensors 331-N can be placed throughout the channel 326. The placement of the number of sensors 331-N can be based on a particular sensing to be carried out on the fluid in channel 326. For example, sensing a particular parameter close to the reservoir 304 can be performed by a sensor close to the reservoir 304 (such as sensor 331). Sensing a particular parameter to be sensed close to the pump actuator 328 can be performed by a sensor of the number of sensors 331-N closer to the pump actuator 328.

The pump actuator 328 is disposed near a closed end of the channel 326 downstream from sensor 331. The pump actuator 328 can be a fluidic inertial pump actuator, which can be implemented using a wide variety of structures. For example, the pump actuator 328 can be a thermal resistor that produces vapor bubbles to create fluid displacement within the channel 326. The displaced fluid can be ejected from the nozzle 323. Actuators can also be implemented as piezo elements (e.g., PZT) whose electrically induced deflections generate fluid displacements within the channel 326. Other deflective membrane elements activated by electrical, magnetic, and other forces are also possible for use in implementing the pump actuator 328.

Figure 4:
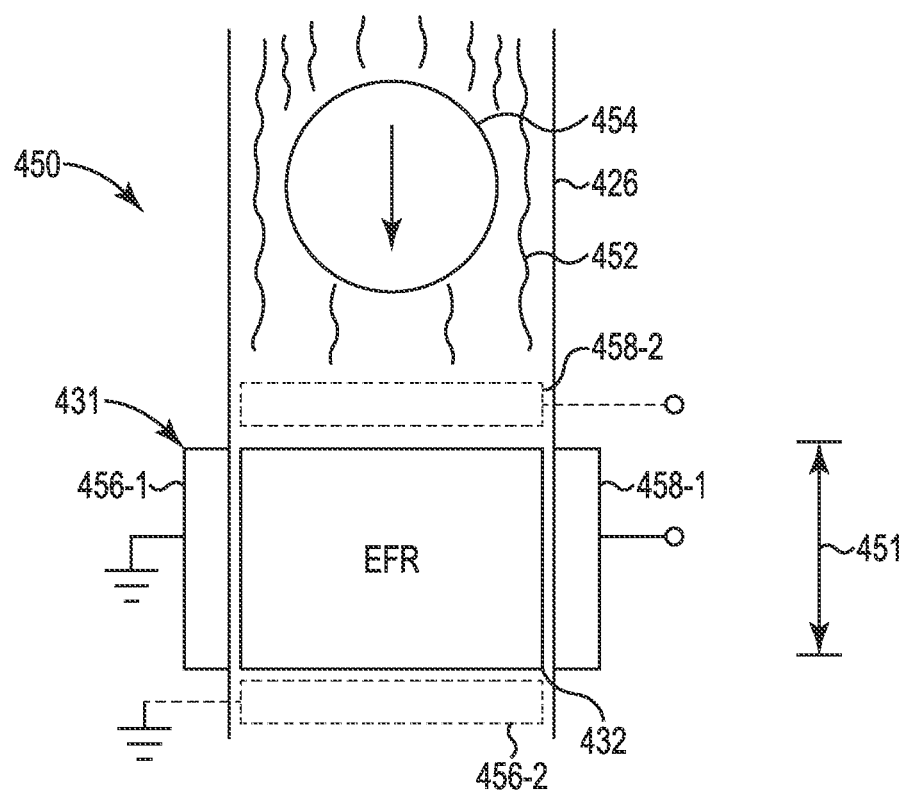
FIG. 4 illustrates an example of a microfluidic sensing system according to the present disclosure.

FIG. 4 illustrates an example of a microfluidic sensing system 450 according to the present disclosure. Microfluidic sensing system 450 can use at least one impedance sensor to detect characteristics of particles (e.g., presence of fluid, type of fluid, etc.) flowing across the impedance sensor. As will be described hereafter, microfluidic sensing system 450 provides enhanced sensing accuracy.

Microfluidic sensing system 450 comprises channel 426 and impedance sensor 431. Channel 426 comprises a microfluidic passage through which fluid 452 including particles 454 pass through. For purposes of this disclosure, the term "particle" encompasses any small minute piece, fragment or amount, including, not limited to, a biological cell or group of biological cells. Channel 426 directs the flow of fluid 452 and particles 454 across or through an electric field region (EFR) 432 (schematically illustrated) formed within channel 426 by impedance sensor 431. Examples of a fluid containing particles include but are not limited to, a blood sample and ink containing pigment/particles or the like.

Impedance sensor 431 forms electric field region 432 within channel 426. Impedance sensor 431 comprises a local electrical ground 456-1 and an electrode 458-1 which cooperate to form a region 432 of electric field lines that extend within an area of channel 426. Electric ground 456-1 and electrode 458-1 are both "local" in that electric ground 456-1 and electrode 458-1 are provided by electrically conductive contacts adjacent to the interior of channel 426 or in relatively close proximity to the interior of channel 426, such as just below or behind an interior surface or skin of channel 426. In contrast to a remote ground located outside of channel 426 or distant channel 426, a substantial majority, if not all, of the electric field region 432 between ground 456-1 and electrode 458-1 is contained within the interior of channel 426. As a result, the distance that the electric field lines between ground 456-1 and electrode 458-1 extend is not so long so as to reduce or weaken signal strength to a point that substantially impairs accuracy of system 450. While the above example describes a ground and electrode, examples are not so limited. In some examples, a high electric charge and a low electric charge can be used to form a region (e.g., such as region 432) of electric field lines.

When particle 454 passes through electric field region 432, the electric field lines of region 432 are at least partially obstructed by particle 454 such that the electric field lines of region 432 are altered and travel around particle 454. The increased length of the electric field lines of region 432, resulting from having to travel around particle 454, increases or raises the electrical impedance that may be detected at electrode 458-1. In a similar manner, a decrease (or rising) of the electrical impedance can occur. For example, a particle that is more conductive than a surrounding fluid can potentially produce a decrease in the electrical impedance. As a result, the increase and/or decrease (e.g., change) in impedance resulting from obstruction of electric field region 432 by particle 454 serves as an indicator of characteristics of particle 454, such as the size of particle 454. A change in impedance can indicate a number of parameters of the fluid. For example, a presence of a small volume of fluid can alter the impedance of the fluid and indicate fluid has been received. A particular change to the impedance can indicate that a particular volume of fluid has been received. A particular change to the impedance can indicate that a particular type of fluid has been received. A number of indications based on the impedance of the fluid can be used to set an indicator (e.g. indicator 133 in FIG. 1) to indicate to further test the parameters and/or properties of the fluid and/or to initiate a test on the fluid (e.g., such as a cell diagnostics test).

Ground 456-1 and electrode 458-1 of impedance sensor 431 are arranged or otherwise configured such that electric field region 432 is elongated along and within channel 426. In other words, the electric field region 432 extends in a direction along or parallel to the direction of channel 426 and parallel to the direction of flow of fluid 452 through channel 426 such that particle 454 interrupts or obstructs the electric field lines of electric field region 432 for a longer or prolonged period of time. As a result, the electrical signals representing changes in impedance as part of the 454 flows through electric field region 432 have characteristic longer ramp ups and ramp downs, facilitating enhanced accuracy for the sensing of the size of particle 454.

While the above example describes an electric field region (e.g., region 432) that extends in a direction along or parallel to a direction of a channel (e.g., channel 426), examples are not so limited. An electric field region can extend in a non-parallel direction (e.g., perpendicular) to a direction of a channel. Such an orientation can cause a particle to interrupt and/or obstruct the electric field lines in an additional way to determine additional impedance measurements.

FIG. 4 illustrates two alternative arrangements for ground 456-1 and electrode 458-1 for forming electric field region 432 which is elongated along channel 426. In a first arrangement, as indicated by solid lines, one or both of ground 456-1 and electrode 458-1 have major dimensions, length L 451, extending along the sides of channel 426 parallel to channel 426. In one implementation, ground 456-1 and electrode 458-1 are formed in sidewalls of channel 426. In another implementation, ground 456-1 and electrode 458-1 are both formed in one face or surface of channel 426, extending along or parallel to the sidewalls of channel 426. For example, in one implementation, ground 456-1 and electrode 458-1 are both formed in a floor of channel 426, each of ground 456-1 and electrode 458-1 extending along or adjacent to the sidewalls of channel 426.

In a second arrangement, as indicated by broken lines, ground 456-2 and electrode 458-2 are spaced from one another in a direction along channel 32. Electric field region 432 is elongated as a result of the upstream-downstream spacing of ground 456-2 and electrode 458-2. In one implementation, both ground 456-2 and electrode 458-2 are formed on a same face or surface of the interior of channel 426. In other implementations, ground 456-2 and electrode 458-2 are formed on different surfaces along channel 426. Although ground 456-2 is illustrated as being downstream of electrode 458-2, this relationship may be reversed.

Figure 5:
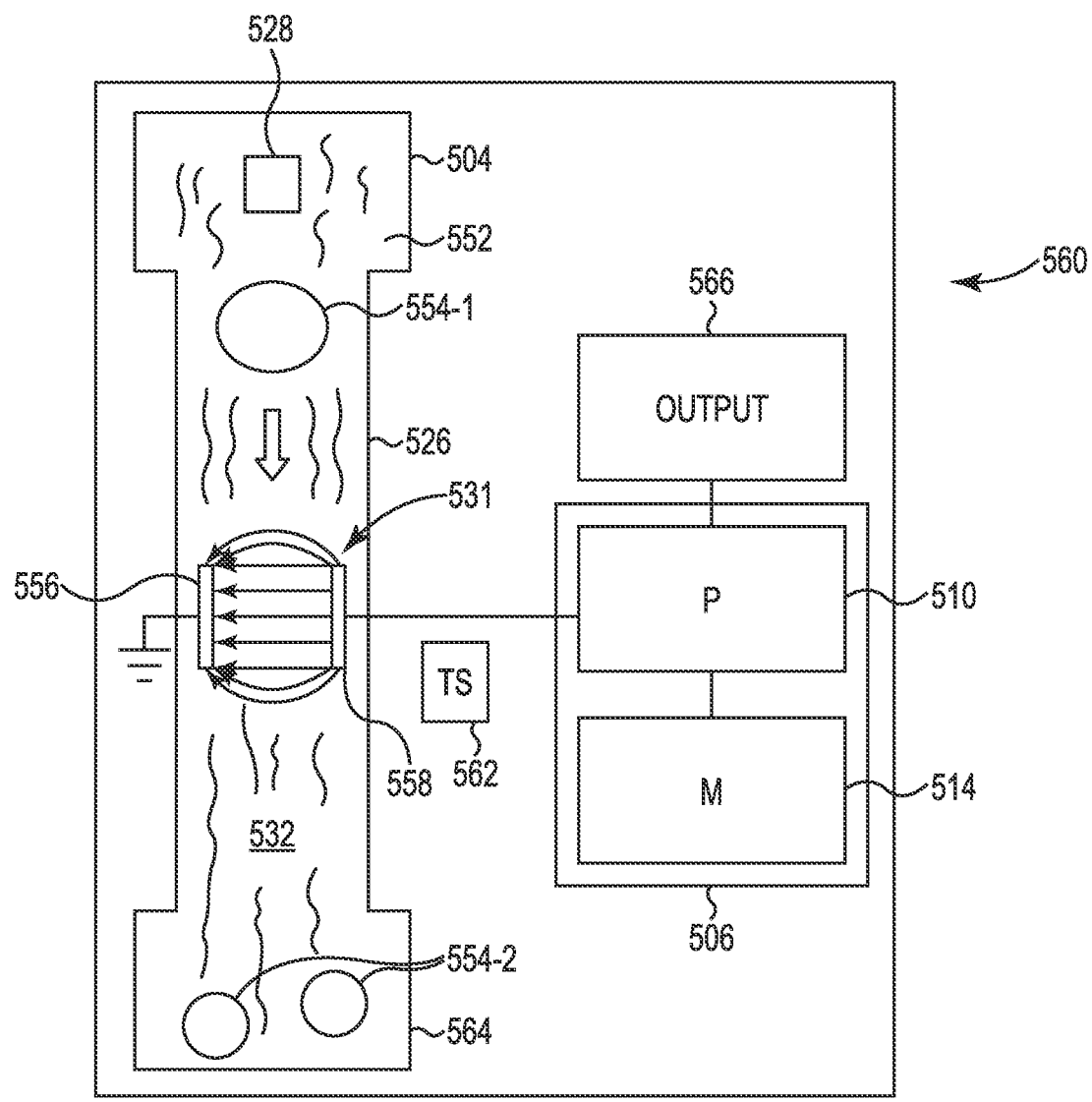
FIG. 5 illustrates an example of a microfluidic sensing system according to the present disclosure.

FIG. 5 illustrates an example of a microfluidic sensing system 560, a particular implementation of microfluidic sensing system 450. As with microfluidic sensing system 450, microfluidic sensing system 560 utilizes an impedance sensor that produces an elongated electric field region along a channel to detect characteristics of particles as cells are passing through the electric field region. Microfluidic sensing system 560 comprises source reservoir 504, pump 528, thermal sensor 562, channel 526, recipient reservoir 564, impedance sensor 531, controller 506 and output 566. Source reservoir 504 comprises a structure to receive a supply of fluid 552 containing particles 554-1, 554-2. Source reservoir 504 communicates with channel 526 to supply fluid 552 and particles 554-1, 554-2 for being driven or drawn through channel 526 across impedance sensor 531.

Pump 528 comprises a mechanism to move fluid 552 and particles 554-1, 554-2 across impedance sensor 531. In the example illustrated, pump 528 drives fluid 552 and particles 554-1, 554-2 from source reservoir 504 along channel 526 and across impedance sensor 531 towards recipient reservoir 564. In some examples, pump 528 may be located within recipient reservoir 564 so as to draw fluid 552 and particles 554-1, 554-2 from source reservoir 504 along channel 526 and across impedance sensor 531. Although one pump is illustrated, in other implementations, system 560 may include more than one pump.

In one implementation, pump 528 comprises a bubble jet pump, also referred to as a resistive or thermal inkjet (TIJ) pump in which a voltage is applied to the resistor resulting in the thin film in contact with the fluid heating to a temperature so as to vaporize a portion of the liquid in contact with the thin film to form a bubble which drives surrounding liquid and particles. In such an implementation, the TIJ resistor serving as pump 528 may additionally serve as a heating device to heat system 560 to a prescribed temperature. In other implementations, pump 528 may comprise other types of pumps such as piezo element (PZT)

pumps or other pumps having deflective membranes activated electrically, magnetically or mechanically.

Temperature sensor 562 (TS) includes a temperature or thermal sensing device to detect temperature such as a temperature to which system 560 has been heated by the TIJ resistor that can serve as a heating device or by another heating device or component independent of pump 528.

Temperature sensor 562 is in communication with controller 506 and provides a closed loop feedback regarding the heating of system 560 by the TIJ resistive heater serving as pump 528 or an independent heating component.

Channel 526 directs fluid 552 and particles 554-1, 554-2 from source reservoir 504 to recipient reservoir 564. Recipient reservoir 564 receives fluid 552 and particles 554-1, 554-2 after particles 554-1, 554-2 pass across impedance reservoir 531. In some implementations, recipient reservoir 564 is connected to source reservoir 504, facilitating recirculation of fluid 552 and particles 554-1, 554-2. In some implementations, channel 526 may additionally comprise filter(s) or other structures through which fluid 552 is to flow when passing from reservoir 504 to reservoir 564. In some implementations, system 560 may comprise multiple differently sized channels, wherein the different size of the channels are used to sort out and separate particles 554-1, 554-2 of different size.

Impedance sensor 531 is similar to impedance sensor 431. Impedance sensor 531 comprises local ground 556 and electrode 558. Ground 556 and electrode 458-1 have major dimensions, length L, extending along the sides of channel 526 parallel to channel 526. In the example illustrated, ground 556 and electrode 558 are both formed in one face or surface of channel 504, extending along or parallel to the sidewalls of channel 526. In the example illustrated, ground 556 and electrode 558 are both formed in a floor of channel 504, each of ground 456-1 and electrode 458-1 extending along or adjacent to the sidewalls of channel 504. Because ground 556 and electrode 558 both formed in the floor of channel 526, the fabrication and formation of channel 526 with local ground 556 and electrode 558 may be less complex and less costly. Ground 556 and electrode 558 produce an elongated electric field region along a channel 526 for enhanced accuracy in detecting characteristics of particles 554-1, 554-2 passing through the electric field region 532.

A change in impedance can indicate fluid has been received. A particular change to the impedance can indicate that a particular volume of fluid has been received. A particular change to the impedance can indicate that a particular type of fluid has been received. A number of indications based on the impedance of the fluid can be used to set an indicator (e.g. indicator 133 in FIG. 1) to indicate to further test the parameters and/or properties of the fluid and/or to initiate a test on the fluid (e.g., such as a cell diagnostics test).

Controller 506 controls the operation of impedance sensor 531. Controller 506 regulates the supply of electrical charge to electrode 558 and controls the detection of impedance by sensor 531. In one implementation, controller 506 further controls the operation of the pump(s), such as pump 528 to control the flow of fluid 552 and particles 554-1, 554-2 along channel 526. In one implementation, controller 506 additionally controls the heating of system 560 by the TIJ resistor or pump 528 or an independent heating component. Controller 506 comprises processing unit ("P") 510 and memory 514. For purposes of this application, the term "processing unit" shall mean a unit that executes sequences of instructions contained in a non-transitory memory or persistent storage device, such as memory 514 ("M"). Execution of the sequences of instructions causes the processing unit to perform actions such as generating control signals. The instructions may be loaded in a random access memory (RAM) for execution by the processing unit from a read only memory (ROM), a mass storage device, or some other persistent storage. In other examples, hard wired circuitry may be used in place of or in combination with software instructions to implement the functions described. For example, controller 506 may be embodied as part of application-specific integrated circuits (ASICs). Unless otherwise specifically noted, the controller is not limited to any specific combination of hardware circuitry and instructions, nor to any particular source for the instructions executed by the processing unit.

Output 566 comprises a device by which results from impedance sensor 531 are presented or otherwise made available or used in analyzing particles 554-1, 554-2. For example, the output 566 can indicate to set indicator 133 when a particular volume and/or type of fluid has been received. The set indicator 133 can indicate to initiate a particular test. In some examples, output 566 can provide results indicating a particular volume of the fluid has not been received and/or that the volume of the fluid has dropped below a threshold value. When the volume drops below a threshold value, the indicator 133 can be turned off and/or an additional off indicator indicating to delay and/or postpone the test can be set. For example, a test on the fluid can use a particular volume of fluid to perform the test. When the threshold volume has been received, an indicator can indicate to initiate the test. When the threshold volume begins to deplete during the test, continued sensing can determine how far the volume has decreased. When the volume of fluid drops below a threshold amount, a determination that the volume is below threshold can unset the indicator and indicate to terminate the test.

In one implementation, output 566 comprises a port, signal transmitting contact or wireless transceiver or transmitter by which electrical signals representing the changes in impedance detected by sensor 531 are made available to external devices for analysis and use in identifying characteristics associated with particle 554-1, 554-2. For example, in one implementation, output 566 may comprise a universal serial bus port by which impedance signals are transmitted to an external computing device or other computing device such as a smart phone, tablet computer, laptop computer or the like for the determination of characteristics of particle 554-1, 554-2, such as the size of particle 554-1, 554-2. In one implementation, the results from the signals produced by impedance sensor 531 are stored in memory 514 for later retrieval and analysis by a computing device.

In another implementation, memory 514 contains computer-readable instructions for directing processor 510 to determine a characteristic on-site from the impedance signals produced by impedance sensor 531. For example, in one implementation, memory 514 may contain instructions for directing processor 510 to determine or estimate the size of particle 554-1, 554-2 based upon impedance signals from sensor 531 as particle 554-1, 554-2 passes across electrical field region 532. In such an implementation, output 566 comprises a visual display or in auditory device to indicate the determined characteristic of particle 554-1, 554-2, such as the determined size of particle 554-1, 554-2. In some implementations, output 566 may additionally facilitate communication with a user of system 560 to provide instructions for the operation of system 560 or to provide confirmation or feedback regarding proper use of system 560 or completion of testing.

In one implementation, system 560 can be implemented as a chip-based device supported on a single platform. In one implementation, the platform may be a handheld platform. As a result, system 560 may provide a microfluidic diagnostic system offering a configurable and mobile platform for point of care health diagnostics such as cell-based diagnostics for detecting infectious diseases and chronic diseases.

In one implementation, the platform comprises a silicon substrate (e.g., silicon 237 in FIG. 2) upon which an impedance measurement circuit is provided for operating and/or controlling electrode 558 to produce electric field region 532 for impedance sensing. In one implementation, the silicon substrate of the platform further supports circuitry for analyzing the sensed impedance signals to identify the characteristic(s) of particle 554-1, 554-2. According to one implementation, the silicon substrate serving as a platform comprises a silicon chip having a size of between 0.5 mm$^2$ to 5 mm$^2$, wherein the silicon substrate supports each of the TIJ resistor(s), serving as both pump 528 and a heater, the one of more impedance sensor electrodes 558 (and associated ground 556), and the thermal sensor(s) 562, in close proximity to one another upon the substrate with the associated circuitry. In one implementation, the silicon substrate supports each of the TIJ resistor(s), serving as both pump 528 and a heater, the one of more impedance sensor electrodes 558 (and associated ground 556), and the thermal sensor(s) 562 at a spacing from one another of less than or equal to 5 mm and nominally at a spacing from one another of less than or equal to 0.5 mm.

In one implementation, the platform can comprise a power supply. In another implementation, the platform is connected to a remote power supply. In one implementation, the platform and the componentry of system 560 are disposable. In such an implementation, the structures and components of system 560 may be fabricated using integrated circuit micro fabrication techniques such as electroforming, laser ablation, anisotropic etching, sputtering, dry and wet etching, photolithography, casting, molding, stamping, machining, spin coating, laminating, and so on.

Figure 6:
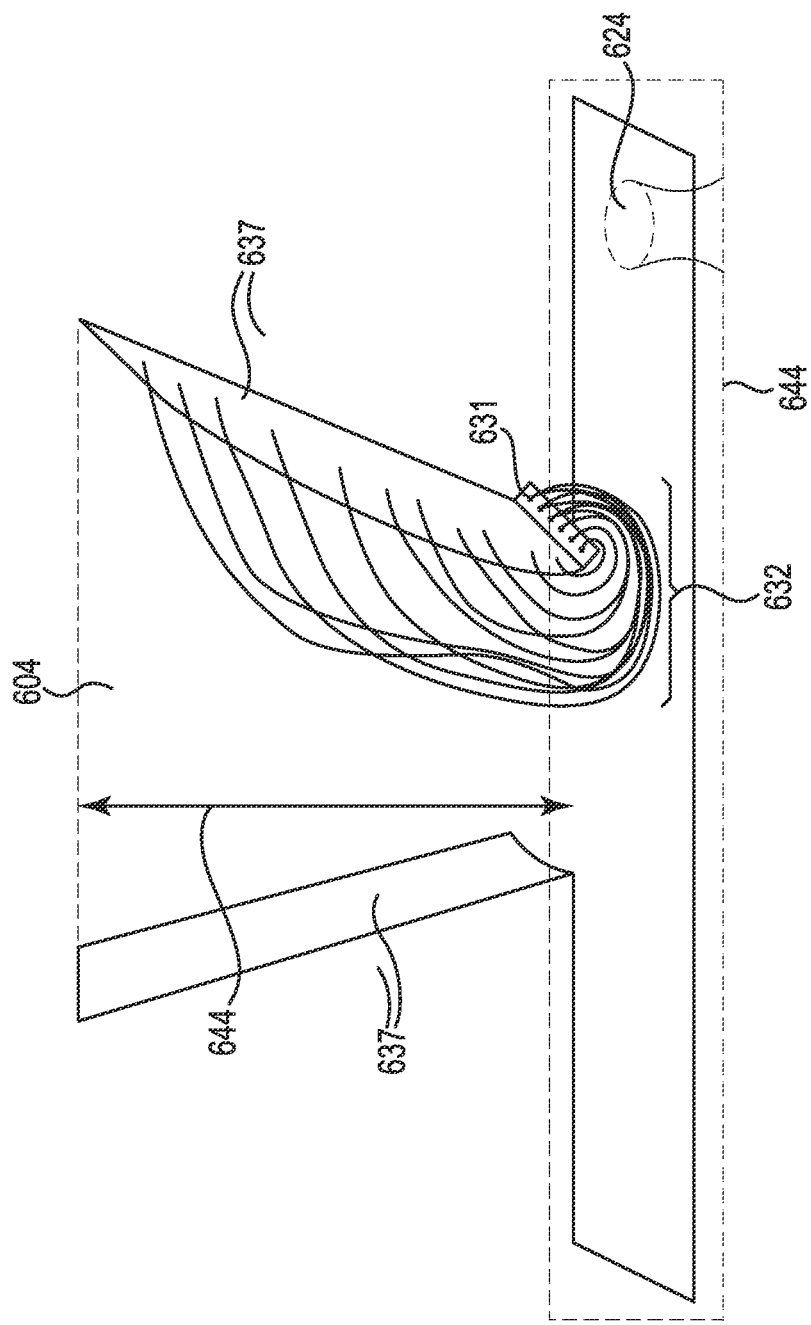
FIG. 6 illustrates an example of a microfluidic device according to the present disclosure.

FIG. 6 illustrates an example of a microfluidic device according to the present disclosure. The microfluidic sensing device in FIG. 6 can be a portion of a microfluidic device (e.g., microfluidic device 102 in FIG. 1). The microfluidic sensing device in FIG. 6 is similar to microfluidic sensing device 201 in FIG. 2. The microfluidic sensing device can include a fluid reservoir 604 (e.g., as in fluid reservoir 104 in FIG. 1). The fluid in the fluid reservoir 604 can enter through a top opening of the microfluidic sensing device. The fluid in the fluid reservoir 604 can include a particular volume of fluid, indicated by a height 644 of the fluid in the fluid reservoir 604. The fluid reservoir 604 can be surrounded and/or in close proximity to silicon 637.

Fluid reservoir 604 can have an opening into sensing region 644 (e.g., at the bottom of fluid reservoir 604). Sensing region 644 can include a number of sensors (e.g., electrodes) 631. The number of sensors 631 can be in electrical communication with co-planar electrodes (e.g., ground electrodes) on silicon substrate (e.g., silicon 637). That is, the sensors 631 can form an electrical field region (e.g., electrical field lines) 632 with the silicon 637. The co-planar electrodes on the silicon substrate can be fabricated using thin film deposition and etching techniques. The electrical field lines 632 can be used to determine a volume (e.g., based on height 644 in the reservoir 604) of a fluid in the reservoir 604.

As fluid enters reservoir 604, sensors 631 can perform a number of sensing operations (e.g., using a plurality of electrical field lines 631) to determine whether fluid has been received. A sensing operation can be performed to determine a type of the fluid using on an impedance measurement based on information from the electrical field lines 632. As fluid in the reservoir 604 is depleted (e.g., volume lowered), indicators can indicate what volume of fluid is left in the reservoir 604. A test can be performed based on the volume of the fluid. For example, if a threshold volume of fluid is in the reservoir 604, the test can be initiated based on an indicator (e.g., indicator 133 in FIG. 1) indicating the threshold volume. If a particular test is altered based on a changing volume of the fluid, an alteration to the test and/or a different test can be initiated.

If a particular test is performed based on a rate of change of impedance, a threshold value can include a rate of impedance change. If a rate of impedance change is indicated, a rate of flow of the fluid through the sensing region 644 can be changed. For example, a nozzle 624 can eject the fluid at a particular rate during a test. As the rate of impedance changes, the particular rate at which the fluid is ejected can be changed.

In this way, a particular test can be administered based on a particular parameter value. The particular parameter value can include a threshold amount, a rate of change of volume, a rate of change of impedance, etc. The measurement of parameter values can ensure that a test is carried out while the particular parameter values are within a threshold value to increase an accuracy of a test.

Although specific examples have been illustrated and described herein, those of ordinary skill in the art will appreciate that an arrangement calculated to achieve the same results can be substituted for the specific examples shown. This disclosure is intended to cover adaptations or variations of examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the examples of the present disclosure includes other applications in which the above structures and methods are used. Therefore, the scope of examples of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed examples of the present disclosure have to use more features than are expressly recited in each claim. Thus, the following claims are hereby incorporated into the Detailed Description, with each claim standing on its own as a separate embodiment.

What is claimed:
1. A system, comprising:
 a microfluidic chip, comprising:
  a fluid reservoir to receive a volume of fluid;
  an impedance sensor within the fluid reservoir to sense a parameter value of the fluid including an impedance value of the fluid; and a communication link to a portable computing device; and the portable computing device comprising a non-transitory computer-readable medium storing instructions executable by the portable computing device to:

compare the sensed parameter value to a threshold value, wherein the threshold value indicates whether conditions are correct at the impedance sensor within the fluid reservoir of the microfluidic chip to conduct a corresponding, specific test on the fluid, the threshold corresponding to the specific test; and indicate to the microfluidic chip to proceed with the test when the sensed parameter value satisfies the threshold value; and detect a change in the impedance value of the fluid and, in response to the change in impedance value, change a parameter of the test being conducted.

2. The system of claim 1, wherein the parameter value is a volume of the fluid and the threshold value is a threshold volume of the fluid that is needed to conduct the specific test.

3. The system of claim 1, wherein the instructions are executable by the portable computing device to repeatedly monitor the sensed parameter value to determine whether the sensed parameter value has deviated from the threshold value.

4. The system of claim 3, wherein, in response to a change in impedance measured by the impedance sensor, the portable computing device executing the instructions is to terminate the test.

5. The system of claim 1, the portable computing device further comprising instructions executable by the portable computing device to determine a type of the fluid based on a change in impedance measured by the impedance sensor, the types of fluid detected including all of blood, diluted blood, reagent, blood mixed with reagent and other biological fluids.

6. The system of claim 1, the portable computing device further comprising instructions to detect a change in a rate of change of impedance at the impedance sensor and, in response to the change in the rate of change, change a parameter of the test being conducted.

7. The system of claim 1, wherein the fluid reservoir comprises an elongated fluid channel, the impedance sensor comprising elongated electrodes arranged longitudinally along the fluid channel to provide an electric field region along a length of the fluid channel.

8. The system of claim 7, wherein the electrodes are embedded under a floor of the channel so as to be underneath a flow of fluid along the fluid channel.

9. A method of operating the system of claim 1, comprising:

detecting, using the impedance sensor, an impedance of a fluid in the fluid reservoir to indicate that a threshold amount of fluid has been received in the reservoir of the microfluidic chip;

when the threshold amount of fluid has been received, initiating, with the portable computing device, a test performed by the microfluidic chip on the received fluid; and with the impedance sensor, detecting a change in the impedance value of the fluid and, in response to the change in impedance value, changing a parameter of the test being performed.

10. The method of claim 9, including detecting whether the threshold amount of fluid has been received in response to receiving the fluid in the reservoir.

11. The method of claim 9, including detecting, using the impedance sensor, a second impedance of the fluid to indicate that the threshold amount has not been received in the reservoir, wherein the test is not initiated when the detection of the fluid indicates the threshold amount has not been received.

12. The method of claim 9, wherein detecting the impedance of the fluid comprises:

measuring the impedance indicating the amount of the received fluid; and comparing the amount of the received fluid to the threshold amount.

13. The method of claim 9, including detecting whether the fluid is a particular type of fluid using an additional impedance sensor.

14. The method of claim 13, wherein the test is initiated when the particular type of fluid is detected and the threshold amount has been received.

15. The method of claim 9, comprising:

receiving the fluid in the reservoir of the microfluidic chip;

measuring, using the impedance sensor, a value of a parameter of the fluid;

comparing, by a processor of the portable computing device, the measured value to a threshold value; and when the measured value exceeds the threshold value, indicating to the microfluidic chip to perform a test on the received fluid.

16. The method of claim 15, wherein the threshold value is a volume of the fluid.

17. The method of claim 15, wherein the impedance sensor is located within the reservoir.

18. The method of claim 15, including when the measured value is below the threshold value, indicating to the microfluidic chip to delay or terminate the test.

19. A system, comprising:

a microfluidic chip, comprising:

a fluid reservoir to receive a volume of fluid;

an impedance sensor within the fluid reservoir to sense a parameter value of the fluid; and a communication link to a portable computing device; and the portable computing device comprising a non-transitory computer-readable medium storing instructions executable by the portable computing device to:

compare the sensed parameter value to a threshold value, wherein the threshold value indicates whether conditions are correct at the impedance sensor within the fluid reservoir of the microfluidic chip to conduct a corresponding, specific test on the fluid, the threshold corresponding to the specific test; and indicate to the microfluidic chip to proceed with the test when the sensed parameter value satisfies the threshold value;

wherein the instructions are executable by the portable computing device to, when impedance measured by the impedance sensor deviates from the threshold value, initiate a different test.

20. A system, comprising:

a microfluidic chip, comprising:

a fluid reservoir to receive a volume of fluid;

an impedance sensor; and a communication link to a portable computing device;

the portable computing device comprising a non-transitory computer-readable medium storing instructions executable by the portable computing device to:

compare the sensed parameter value to a threshold value, wherein the threshold value indicates whether conditions are correct at the impedance sensor within the fluid reservoir of the microfluidic chip to conduct a corresponding, specific test on the fluid, the threshold corresponding to the specific test and indicate to the microfluidic chip to proceed with the test when the sensed parameter value satisfies the threshold value; and detect a change in the impedance value of the fluid and, in response to the change in impedance value, change a parameter of the test being conducted.

\* \* \* \* \*